United States Patent
Scaggs

(10) Patent No.: US 6,771,683 B2
(45) Date of Patent: Aug. 3, 2004

(54) INTRA-CAVITY BEAM HOMOGENIZER RESONATOR

(75) Inventor: Michael J. Scaggs, Weston, FL (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/035,919

(22) Filed: Oct. 18, 2001

(65) Prior Publication Data

US 2003/0227956 A1 Dec. 11, 2003

Related U.S. Application Data

(60) Provisional application No. 60/243,512, filed on Oct. 26, 2000.

(51) Int. Cl.[7] ............................. H01S 3/225; H01S 3/08
(52) U.S. Cl. ............................ 372/57; 372/100; 372/55
(58) Field of Search ......................... 372/57, 98, 100, 372/55

(56) References Cited

U.S. PATENT DOCUMENTS

| 4,149,773 A | | 4/1979 | Reid | |
|---|---|---|---|---|
| 4,564,949 A | * | 1/1986 | Trolinger | ...................... 372/93 |
| 5,264,412 A | | 11/1993 | Ota et al. | |
| 5,698,343 A | * | 12/1997 | Sutherland et al. | ............ 430/1 |
| 5,835,520 A | * | 11/1998 | Das et al. | ..................... 372/57 |
| 5,986,807 A | * | 11/1999 | Fork | .......................... 359/569 |

FOREIGN PATENT DOCUMENTS

| DE | 39 04 896 A1 | * | 8/1990 | ........... G02B/27/10 |
|---|---|---|---|---|
| DE | 195 33 414 A1 | * | 3/1997 | ........... G02B/27/09 |
| GB | 2 220 502 A | * | 1/1990 | ............. H01S/3/00 |
| WO | WO 97/08792 A1 | * | 3/1997 | ............. H01S/3/23 |

* cited by examiner

*Primary Examiner*—Don Wong
*Assistant Examiner*—James Menefee
(74) *Attorney, Agent, or Firm*—Anton J. Hopen; Molly L. Sauter; Smith & Hopen, P.A.

(57) ABSTRACT

An excimer or molecular fluorine laser system includes a discharge chamber filled with a gas mixture, multiple electrodes within the discharge chamber and connected to the discharge circuit for energizing the gas mixture, a resonant cavity including the discharge chamber for generating a laser beam, and an intracavity homogenizer for homogenizing an intensity profile of the laser beam generated in the resonator. The intracavity homogenizer may include each of a first bi-prism and a second bi-prism disposed at opposite ends of the resonant cavity and having the discharge chamber disposed therebetween. In this case, optical axes of the first bi-prism and the second bi-prism are each at least substantially parallel to the optical axis of the laser beam.

35 Claims, 3 Drawing Sheets

INTRA-CAVITY BEAM HOMOGENIZER RESONATOR

PRIORITY

This application claims the benefit of priority to U.S. provisional patent application No. 60/243,512, filed Oct. 26, 2000.

BACKGROUND OF THE INVENTION

1. Field of the Invention

The invention relates to an intra-cavity laser beam homogenizer resonator, and particularly to a resonator including one or more bi-prisms for generating a laser beam having a "top-hat" intensity profile along a selected axis.

2. Discussion of the Related Art

Single Bi-Prism Homogenizers

A single bi-prism may be positioned in the beam path of an outcoupled laser beam as a homogenizer. The laser beam may have an approximately Gaussian intensity profile as it is incident normal to the flat surface of a bi-prism. As the beam exits the angled surface, the bi-prism splits the wavefront and refracts the two partial beams toward each other. At some distance D past the bi-prism, the intensity profiles at half maximum of the partial beams coincide. At that distance D, the intensity is approximately uniform across the entire beam profile. Beyond distance D, the partial beams diverge from each other and the intensity is no longer uniform. Some related art references include U.S. Pat. Nos. 4,149,773, 4,370,026 (disclosing to use two bi-prisms with orthogonal axes to homogenize in both directions) and U.S. Pat. No. 5,264,412, as well as German published patent application no. DE 39 04 896 A1 and United Kingdom published patent application no. 2 220 502 A (disclosing optionally to use two bi-prisms with orthogonal axes to homogenize in both directions).

Bi-Prism Homogenizer-Collimator

German published patent application no. DE 195 33 314 A1 discloses using one bi-prism to homogenize the short axis of an excimer laser beam profile and a second bi-prism to re-collimate the beam. The bi-prisms, oriented with their angled faces toward each other and their axes aligned, are placed in the path of a previously outcoupled excimer laser beam, i.e., extra-cavity. The beam passes through the first bi-prism, where it is split into two partial beams that are refracted toward each other. The second bi-prism is placed where the partial beams have the desired degree of overlap (in this case, the desired intensity profile is somewhat higher at the edges than at the center). The second bi-prism refracts the two partial beams so that they are parallel to the original axis. Both bi-prisms are transmissive optics disposed along the beam path of the outcoupled laser beam such that they are not incorporated into the laser resonator. A shortfall of the DE 195 33 314 A1 published application is illustrated below, wherein a bi-prism homogenizer-collimator advantageously disposed within a laser resonator is described with reference to a preferred embodiment.

Multi-Pass Amplifier

Published PCT application no. WO 97/08792 discloses using a pair of bi-prisms and two plane mirrors to direct a laser beam through an amplifier multiple times, with the beam taking a different path on each pass. A mirror is placed behind each bi-prism, and an amplifier is placed at the midpoint between the bi-prisms. An incoming laser beam is incident at an angle on one facet of one of the bi-prisms. The beam is sequentially reflected by the mirrors and refracted by different facets of the bi-prisms, so that the beam passes through the amplifier multiple times before exiting through a hole in one section of one of the bi-prisms. The axes of the bi-prisms are rotated relative to each other so that the beam takes a different path on each pass through the amplifier.

The WO 97/08792 published application describes an arrangement for amplifying an input laser beam including bi-prisms for altering the path of the beam through the amplifying medium on successive passes. The beam is reflected between a pair of mirrors and is refracted by a bi-prism each time it propagates between a mirror and the amplifier. The arrangement described in the '792 application is not, however, a resonant cavity, and the '792 application does not disclose an arrangement that can be used to modify the intensity profile of a beam. Instead, a narrow beam is incident on only one facet of the angled surface of a bi-prism on any given pass. Moreover, the multi-pass amplifier disclosed in the '792 application is configured such that the axes of the bi-prisms are not aligned, so that the light takes a different path on each pass in order to avoid coupling effects. Below, a resonator is described in accord with a preferred embodiment that is advantageous over the resonator described in the WO 97/08792 application, and wherein the axes of a pair of intracavity bi-prisms are aligned.

Recognized in the Invention

None of the references mentioned above discloses or suggests using of an intracavity bi-prism or a pair of bi-prisms either as resonator reflectors or otherwise disposed within a laser resonator cavity. It is recognized in the present invention that the preferred embodiments described below including a second bi-prism to collimate the beams after traversing the first bi-prism, and a laser resonator including at least one bi-prism, which is further preferably configured and disposed as a resonator reflector, each provide advantageous laser resonator arrangements for generating laser beams with desired, homogeneous beam profiles not taught or suggested in the related art.

SUMMARY OF THE INVENTION

An excimer or molecular fluorine laser system is provided including a discharge chamber filled with a gas mixture at least including a halogen-containing molecular species and a buffer gas, a discharge circuit, multiple electrodes within the discharge chamber and connected to the discharge circuit for energizing the gas mixture, a resonant cavity including the discharge chamber for generating a laser beam, and an intracavity homogenizer for homogenizing an intensity profile of the laser beam generated in the resonator.

The intracavity homogenizer may include a first bi-prism and a second bi-prism disposed at opposite ends of the resonant cavity and having the discharge chamber disposed therebetween, or a first bi-prism and a second bi-prism disposed within the resonant cavity, and either way wherein optical axes of the first bi-prism and the second bi-prism are each at least substantially parallel to the optical axis of the laser beam.

The intracavity homogenizer may include a bi-prism disposed at one end of the resonant cavity, or a bi-prism disposed within the resonant cavity, and either way wherein an optical axis of the bi-prism is at least substantially parallel to the optical axis of the laser beam. The resonant cavity may further include a roof prism, preferably arranged as a resonator reflector.

INCORPORATION BY REFERENCE

Figure 1:
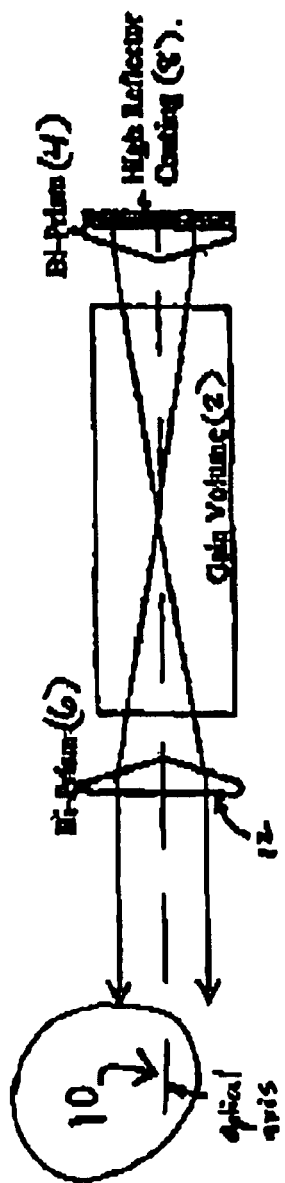
FIG. 1 schematically illustrates a resonant cavity including first and second bi-prisms for an excimer or molecular fluorine laser system according to a preferred embodiment.

What follows is a cite list of references each of which is, in addition to those references cited above and below, and including that which is described as background and the summary of the invention, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

U.S. patent application Ser. Nos. 09/769,019, 09/712,367, 09/771,366, 09/317,695, 09/244,554, 09/657,396, 09/883,097, 09/594,892, 09/602,184, 09/599,130, 09/598,552, 09/629,256, 09/694,246, 09/715,803, 09/454,803, 09/738,849, 09/843,604, 09/883,127, 09/900,703, 09/594,892, 09/598,552, 09/512,417, 09/712,877, 09/574,921, 09/718, 809, 09/733,874, 09/131,580 and 09/780,124, each of which is assigned to the same assignee as the present application;

U.S. Pat. Nos. 4,149,773, 4,370,026, 5,264,412, 6,154,470, 6,157,662, 6,219,368, 5,946,337, 6,061,382, 6,285,701, 6,269,110, 6,212,214, 5,181,222, 5,675,691, 4,765,732, 4,676,642, 5,002,386, 4,562,350, 4,611,245, 4,533,215 and 4,099,830;

German patent applications no. DE 39 04 896 A1, DE 195 33 314 A1 and DE 3017512AI;

United Kingdom patent applications No. GB 2 220 502 A and GB 2 222 696 A;

PCT application no. WO 97/08792;

Russian patent no. SU 1670380 AI;

French patents no. 2 380 554 and 2 265 113;

A. N. Ageev et al., "Investigation of the interaction between laser radiation and fast electrons in a Fresnel electrostatic bi-prism," Tech. Phys. Lett., 22 (2) (February 1996), pp. 144–145.;

N. H. Rizvi et al., "Production of submicrometer period Bragg gratings in optical fibers using wavefront division with a bi-prism and an excimer laser source," Appl. Phys. Lett., 67 (6) (August 1995), pp. 739–741.;

J. F. Cormier et al., "Spatial and temporal beam break-up in self-mode-locked Ti:sapphire lasers," Cleo '94, Vol. 8 (May 8–13, 1994), Anaheim, Calif., pp. 180–181.;

A. E. Danilov et al., "Laser Interferometer with Spatial Division of the Wave Front," Soviet Physics-Lebedev Institute Reports, No. 5, (1980), pp. 1–4;

Lj. Janicijevic et al., "Transformation of a laser Gaussian beam by a Winkelmann-Abbe bi-prism," Optik, 75, No. 2 (1987) pp. 47–53;

V. H. Astinov, "Spatial modulation of the pump in the ultrabroadband dye laser with a "spatially-dispersive" resonator," Optics Communications, 118 (1995) pp. 297–301; and Z. Chuangzhao et al., "A Optical Device of Focusing and Shaping for Semiconductor Diode Laser Beam," J. Optoelectronics Laser, Vol. 9, No. 4 (August 1998).

DETAILED DESCRIPTION OF THE PREFERRED EMBODIMENTS

An intra-cavity beam homogenizer resonator, according to preferred embodiments described below, is advantageously included in an excimer or molecular fluorine laser resonator for generating a laser beam that features a "top-hat" intensity profile along a selected axis. In one preferred embodiment, the resonator comprises two bi-prisms with large or obtuse apex angles, placed outside and at opposite ends of a gain medium such as a gas mixture filled discharge chamber for a laser. Each bi-prism is oriented with an angled inner face, preferably including two segments oppositely angled relative to the optical axis of the resonator, toward the gain medium and a flat or substantially flat outer face that is substantially perpendicularly oriented with the optical axis of the laser resonator, i.e., shaped and oriented as a typical resonator reflector surface. The optical axes of the bi-prisms are substantially parallel so that the refractive power of both bi-prisms acts along the same axis of the beam profile. One bi-prism may have its flat outer face coated with a highly reflective coating, while the other bi-prism has its flat face coated with a partially reflective coating such that the latter bi-prism also serves as an output coupler of the resonator. Either or both bi-prisms may or may not have an antireflective coating on an angled inner face. The coatings may be, referenced from the HR side of the laser to the output, a highly reflective (>99%) coating 8 on the piano side of the rear prism 4, an antireflection coating on the wedged side of the HR prism 4, an antireflective coating on the wedged side of the output coupler prism 6 and finally a partial reflecting coating on the piano side of the output coupling prism 6. The bi-prisms produce a collimated beam having a top-hat intensity distribution along a preferred axis, which is preferably the short-axis of the beam profile for an excimer or molecular fluorine laser system.

In other embodiments, one or two bi-prisms are disposed in the resonator. One or two bi-prisms may be disposed between the discharge chamber and the same or a different resonator reflector surface. A resonator reflector surface may be formed on the flat surface of either bi-prism, or a resonator reflecting surface may be disposed just after either bi-prism, or a resonator reflecting surface may be spaced somewhat from the bi-prism.

The homogenizer resonator according to a preferred embodiment can be adapted for use with many types of laser resonators that produce beams having a substantially Gaussian intensity profile along the long and/or short axis of the beam profile. In a particularly preferred embodiment, the laser is an excimer or molecular fluorine laser, such as a KrF laser emitting at 248 nm, an ArF laser emitting at 193 nm or a $F_2$ laser emitting at 157 nm, and the short axis is homogenized by the bi-prisms. The bi-prism resonator may be configured for use with an EUV lithographic exposure radiation source such as may generate exposure radiation around 11 nm to 15 nm. Particularly for the EUV case, but also alternatively for the DUV and/or VUV cases, the refractive bi-prisms may be replaced with reflective components according to Babinet's principle, while the segment or preferably two segments of the angled face of the reflective equivalent of a bi-prism of a preferred embodiment would be angled toward the optical axis of the resonator rather than away, as is preferred for the bi-prisms or bi-prisms shown, e.g., at any of FIGS. 1–5.

As mentioned above, a preferred two bi-prism includes an angled face including preferably two segments relatively oriented at a large or obtuse apex angle which is at least somewhat less than 180°, which would result in a flat face, and the optimum apex angle may vary with the length of the laser gain length. For example, the apex angle may be 179°. A preferred output coupler bi-prism (see any of FIGS. 1–5) may or may not have an anti-reflection coating on the segments of the angled face and a partially reflecting coating on its plano surface. The angled surface preferably faces the gain medium and is orientated such that the power of the bi-prism affects preferably the short axis of the laser beam, and alternatively the long axis or along whatever direction of the beam cross-section that it is desired to have homogenized. A preferred highly-reflective resonator reflector bi-prism may or may not have an anti-reflection coating on the angled surfaces of the prism facing the gain medium and a high reflection coating on the piano surface. The high reflective bi-prism may be oriented otherwise similarly as or identical to the output coupler bi-prism described above. In an excimer laser, e.g., a pair of 5° windows, or Brewster windows (preferred for the molecular fluorine laser, see U.S. patent application Ser. No. 60/296,898, which is assigned to the same assignee as the present application and is hereby incorporated by reference), or windows preferably angled somewhat from normal to the optical axis, and alternatively oriented normal to the axis, may be used to seal the excimer or molecular fluorine gas within the discharge chamber, while allowing the beam to enter and exit the chamber. The bi-prisms are mounted external to the discharge chamber and aligned colinearly with the laser cavity. In an alternative embodiment, a bi-prism may be used as a window on the laser chamber, and as such seal the chamber (see U.S. patent application Ser. No. 09/317,695, which is assigned to the same assignee as the present application and is hereby incorporated by reference, which discloses to seal the discharge chamber with a line-narrowing optic such as a prism).

A feature of the preferred embodiments is transform the typically Gaussian profile in the short axis of an excimer or molecular fluorine laser beam into a more "top hat"-like profile, which may be typically less "top hat"-like than the long axis if the bi-prism or bi-prisms according to a preferred embodiment is not used. This is accomplished according to a preferred embodiment by having two gain paths cross diagonally within the Gaussian or non-uniform gain path. When one integrates the gain for photons traveling through the gain volume diagonally, then the value is substantially the same for all photons. The bi-prism or bi-prisms produce a collimated beam having a top-hat intensity distribution along a preferred axis.

FIG. 1 schematically illustrates a resonator arrangement according to a preferred embodiment. The resonator arrangement shown schematically in FIG. 1 includes a gain volume 2, which may be an excimer or molecular fluorine laser discharge chamber (see the description below with reference to FIG. 6), and a first bi-prism 4 and a second bi-prism 6. Additional optics such as line-narrowing and/or line-selection optics may be and preferably are included in the resonator, particularly if the laser is an ArF, KrF or $F_2$ laser. Many additional other components are also included in a preferred overall laser system, and are described below with reference to FIG. 6.

The first bi-prism 4, shown on the right of the gain medium 2 in FIG. 1, has an angled face facing toward the gain volume 2 and a planar or piano face facing away from the gain volume 2. The angled face includes two angled segments having normals that each form acute angles to the optical axis 10 of the resonator. As shown, preferably each of the two angled segments begin approximately on the optical axis 10 and its normal points away from the axis 10 in the direction toward the gain volume 2, i.e., the normal to the upper segment points at an acute angle up from directly left in FIG. 1 and the normal to the lower segment points at an acute angle down from directly left in FIG. 1. In this sense, the bi-prism 4 is preferably symmetric with respect to the optical axis 10 in the plane of FIG. 1 and in the beam profile cross-section, with the upper segment of the angled face above the optical axis 10 and the lower segment of the angled face below the optical axis 10. The first bi-prism 4 also includes a highly-reflective coating 8 formed on its planer surface which serves as a highly-reflective resonator reflector surface.

The second bi-prism 6, shown on the left of the gain medium 2 in FIG. 1, has an angled face facing toward the gain volume 2 and a planar or piano face facing away from the gain volume 2. The angled face includes two angled segments having normals that each form acute angles to the optical axis 10 of the resonator. As shown, preferably each of the two angled segments begin approximately on the optical axis 10 and its normal points away from the axis 10 in the direction toward the gain volume 2, i.e., the normal to the upper segment points at an acute angle up from directly right in FIG. 1 and the normal to the lower segment points at an acute angle down from directly right in FIG. 1. In this sense, the bi-prism 6 is preferably symmetric with respect to the optical axis 10 in the plane of FIG. 1 and in the beam profile cross-section, which is preferably in the same short-axis direction as the first bi-prism 4, described above, with the upper segment of the angled face of the second bi-prism 6 being above the optical axis 10 and the lower segment of the angled face below the optical axis 10. The second bi-prism 6 also includes a partially-reflective coating 12 formed on its planer surface which serves as a partially-reflective resonator reflector surface, and the planer surface of the bi-prism 6 having the partially-reflective coating 12 formed thereon serves as an output coupling surface, such that the bi-prism 6 serves the additional function of outcoupling the laser beam from the resonator.

Figure 2:
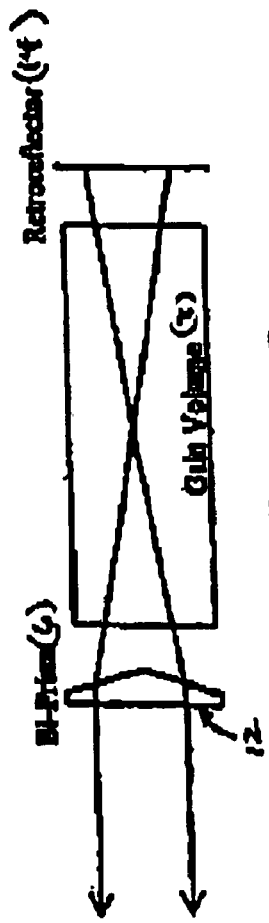
FIG. 2 schematically illustrates a resonant cavity including a bi-prism for an excimer or molecular fluorine laser system according to a preferred embodiment.

FIG. 2 schematically illustrates another embodiment of a bi-prism resonator including a single bi-prism 6. The embodiment shown schematically at FIG. 2 differs from that described above with reference to FIG. 1 in that a retro-reflector mirror 14 is substituted for the bi-prism 4 in the embodiment of FIG. 1 to obtain the embodiment of FIG. 2. An alternative embodiment would take out the bi-prism 6, as well, and preferably substitute another retro-reflector for the bi-prism 6, wherein this alternative embodiment have advantage when reflective optics are desired such as for EUV applications, as well as perhaps VUV applications, i.e., sub-200 nm. As an example, a Lambda Physik NovaLine 100 KrF excimer laser operating at 248 nm may be used with this resonator arrangement, or any of the resonator arrangements provided herein.

Use of the retroreflector 14 does allow on-axis beams to dominate the gain in the cavity. This may result in the light being focused outside the cavity by the bi-prism in the same manner as an external bi-prism homogenizer would. However, at least one side of the cross diagonal beam may be improved to have good uniformity with this embodiment.

In the set-up shown schematically at FIG. 2, as well as with any of the other embodiments described herein, a tunable beam attenuator may be incorporated either within the cavity or outside the cavity (see, e.g., U.S. patent applications Ser. Nos. 09/774,238 and 60/309,939, which are assigned to the same assignee as the present application and are hereby incorporated by reference). If the attenuator is incorporated into the cavity, the retroreflector/bi-prism may be caused to lase favoring crossed diagonal gain regions. In this case, use of an about 25% reflectivity output coupler was shown to work well with the embodiment shown schematically at FIG. 2 with the intracavity attenuator, although reflectivities lower than that may be and are preferably used when the attenuator is not present. Improvement in the uniformity of the attenuator coating can improve the beam profile significantly when the intracavity attenuator is used. In the simulated 25% reflective output coupler setup, an observed efficiency was about 67% of the stable configuration, while in the dual bi-prism setup, the efficiency was observed to be about 60% (some ways to improve efficiency may be described at U.S. patent application Ser. No. 09/791,430, which is assigned to the same assignee as the present application and is hereby incorporated by reference).

Figure 3:
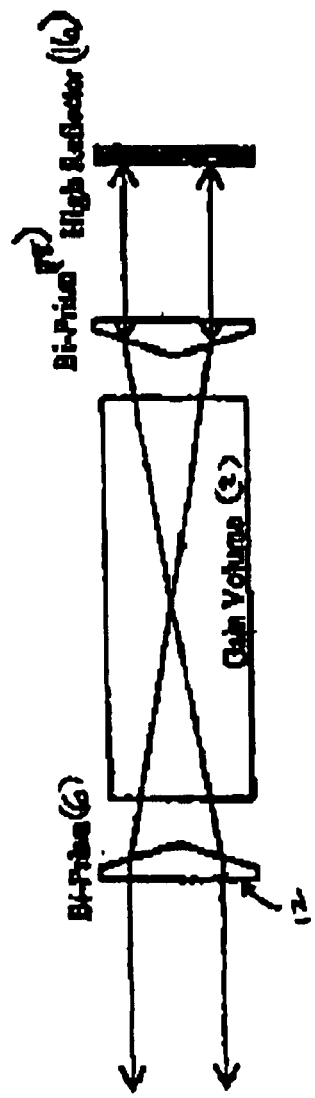
FIG. 3 schematically illustrates a resonant cavity including first and second bi-prisms for an excimer or molecular fluorine laser system according to a preferred embodiment.

FIG. 3 schematically illustrates another embodiment including the gain medium 2 and bi-prism output coupler 6 described above with partially reflecting planer surface 12. The resonator shown schematically at FIG. 3 also includes a 0° angle of incidence high reflector mirror 16 and bi-prism 18 disposed between the high reflector mirror 16 and the gain volume 2. the bi-prism 18 does has neither a highly-reflective nor a partially-reflective coating formed thereon, as the bi-prisms 4, 6 and 14 described above alternatively have. The bi-prism 18 may or may not have an anti-reflection coating on its angled face and/or its planer face. In this embodiment, it is best that longitudinal placement of the bi-prisms 6, 18 not be too close such that the two beams formed by the resonator would be seen at a distance of about 0.5 meters. If the spacing of the two bi-prisms 6, 18 is instead increased, then the two beams would recombine. The spacing is at least in-part determined by the gain length of the cavity, along with how close the optic can be functionally disposed to the gain volume 2. Geometrically, an angle that the light rays will be desired to cross in the cavity can be established, and the proximity to the gain medium 2 of the optic dependent upon that angle. The prism formula $s=\Delta/(n-1)$ may be used, where "s" is the wedge angle of the prism, $\Delta$ is the angle the light rays make in the cavity and n is the index of refraction of the prism material. The apex angle of the prism will be $180°-(2\bullet s)$. Mode-hopping may be observed in this arrangement and optimization in the reflectivity of the output coupler can be used to improve the performance. An anti-reflection coating may or may not be used on the angled face of the bi-prism 6, as well.

Figure 4A:
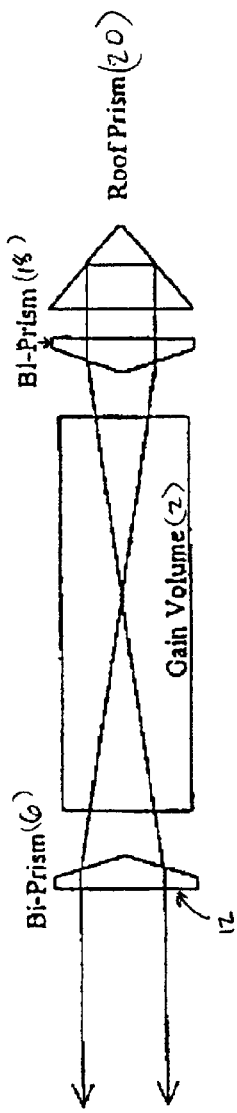
FIG. 4a schematically illustrates a resonant cavity including first and second bi-prisms and a roof prism for an excimer or molecular fluorine laser system according to a preferred embodiment.

FIG. 4a schematically illustrates a resonant cavity including a first bi-prism 6, a second bi-prism 18 and a roof prism 20, particularly for use with an excimer or molecular fluorine laser system according to a preferred embodiment. The bi-prism 6 is preferably as described above for output coupling the beam including reflective coating 12 formed on its planer surface. Bi-prism 18 is preferably also as described above with reference to FIG. 3, wherein no reflective coatings or surfaces are included, and either of the planer or angled faces of the bi-prism 18 may or may not have an anti-reflection coating formed thereon. The roof prism 20 is preferably highly reflective and serves as a highly reflective resonator reflector. The roof prism 20, with its 90° corner, reflects incident rays of light back anti-parallel to there incident direction, even without as precise an alignment procedure as may be used when a 0° reflector. In principle, the alignment of the resonator arrangements described herein would be done in substantially the same way as may be understood by those skilled in the art for a stable resonator cavity. In fact, the long axis is preferably a stable resonator, while the short axis has the crossed beam according to a preferred embodiment. One would use a HeNe or diode laser to align these components, for example (see U.S. Pat. No. 6,014,206, which is hereby incorporated by reference). Highly reflective coatings may be applied to the back surfaces of the roof prism 20, and an anti-reflection coating may or may not be applied to the incident surface of the prism 20 wherein the incident surface faces the discharge chamber 2 and faces and is substantially parallel to the planer surface of the bi-prism 18.

Figure 4B:
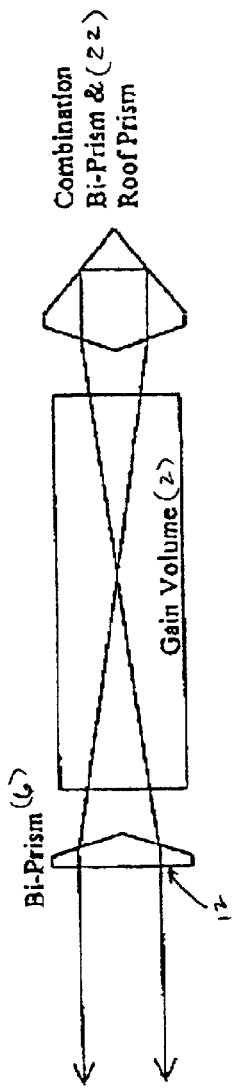
FIG. 4b schematically illustrates a resonant cavity including a first bi-prism and a combination second bi-prism/roof prism component for an excimer or molecular fluorine laser system according to a preferred embodiment.

FIG. 4b schematically illustrates a resonant cavity including a first bi-prism 6 and a combination second bi-prism/roof prism 22 component particularly for use with an excimer or molecular fluorine laser system according to a preferred embodiment. The combination bi-prism/roof prism 22 replaces the separate bi-prism 18 and roof prism 20 components of the embodiment described above and schematically shown at FIG. 4a, and serves to perform the functions of the bi-prism 18 and roof prism 20 in a single element 22. The elimination of the planer surface of the bi-prism 18 and the incident surface of the roof prism 20 of the embodiment of FIG. 4a in the embodiment of FIG. 4b reduces some losses that may otherwise occur when the beam impinges upon these surfaces.

Figure 5:
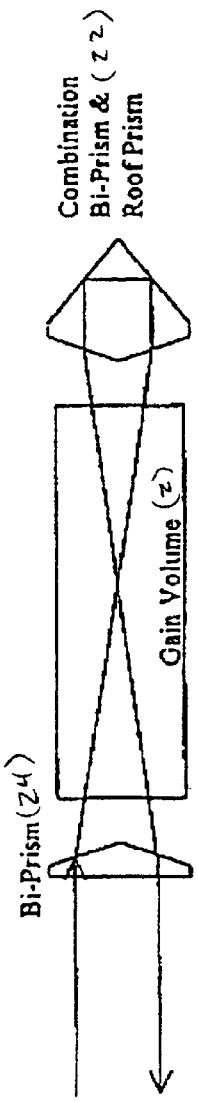
FIG. 5 schematically illustrates an optical amplifier according to a preferred embodiment.

FIG. 5 schematically illustrates an optical amplifier according to a preferred embodiment. The use of one or more bi-prisms 4, 6, 18, and/or retro-reflector 14, and/or roof prism 20, and/or combination bi-prism/roof prism 22 in the laser cavity may also advantageously accommodate pulsed amplification of short pulses or where it is desired to increase the homogenity of a seeded laser pulse. In this sense, although FIG. 5 provides an example of an arrangement for doing this, any of the embodiments described with reference to FIGS. 4a, 4b or 5 may be advantageously used owing to the traversal of a different path through the gain medium of the beam on its way to the right and then to the left in FIG. 5, although because the gas is moving through the discharge region of an excimer or molecular fluorine laser, the arrangements of FIGS. 1–3 may be used, as well, although the advantage of using the bi-prism 4, 6 and/or 18, and or retro-reflector 14 is not as great as for the homogenizing purposes described above. Use of the bi-prisms 4, 6, 18 and/or retro-reflector 14 may accommodate "straight-on" access to a laser amplifier. The bi-prism on both sides of the amplifier would be antireflection coated for best results. The read bi-prism could be a combination bi-prism and roof prism which would allow for a two-pass amplification with automatic alignment.

Overall Laser System

Figure 6:
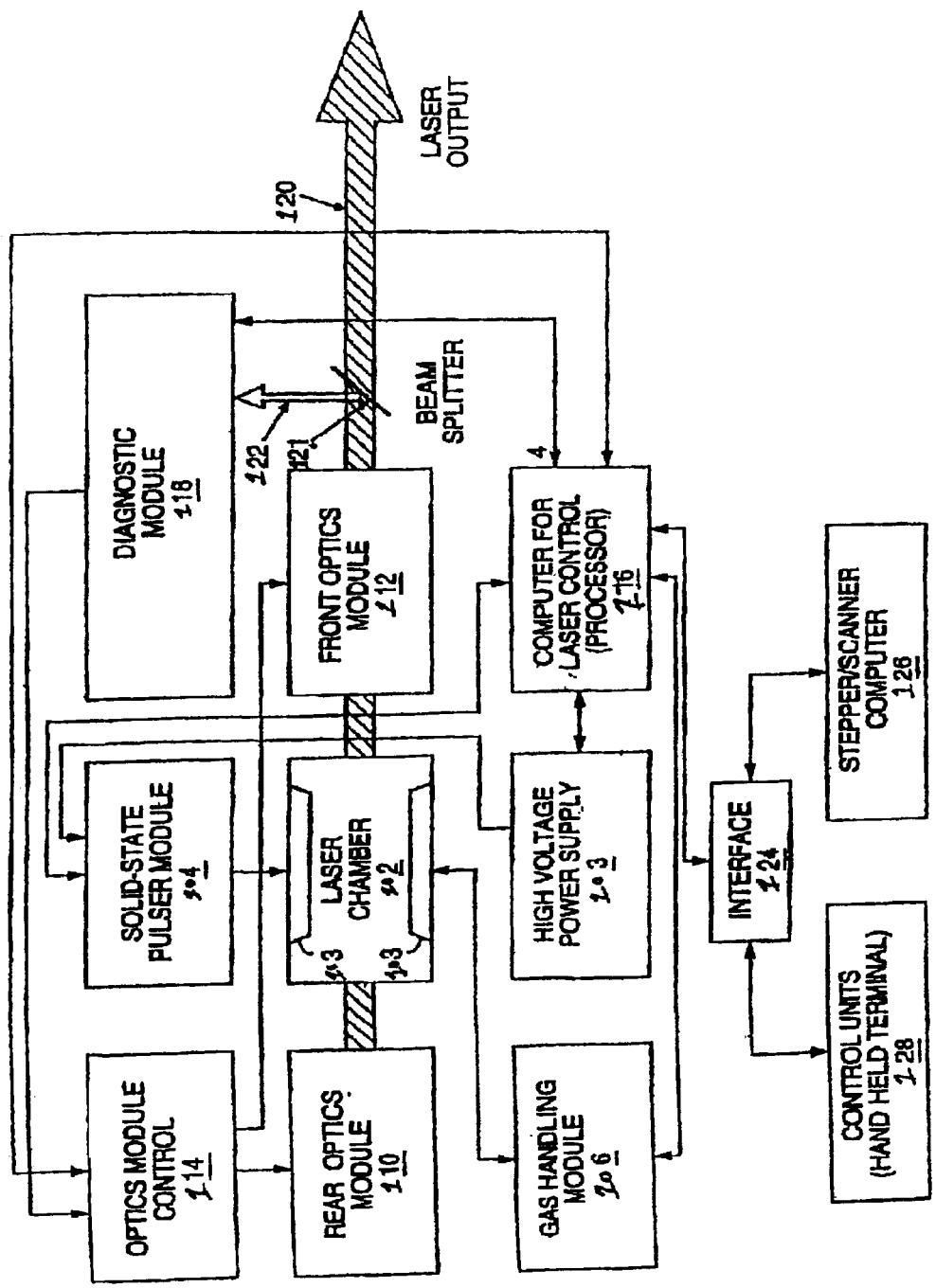
FIG. 6 schematically illustrates an overall excimer or molecular fluorine laser system according to a preferred embodiment.

FIG. 6 schematically illustrates an overall excimer or molecular fluorine laser system according to a preferred embodiment which preferably includes the advantageous features described above with reference to FIGS. 1–5. Referring to FIG. 6, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 6 to meet the requirements of that application. For this purpose, alternative DUV or VUV laser system and component configurations are described at U.S. patent applications Ser. Nos. 09/317,695, 09/244,554, 09/452,353, 09/512,417, 09/599,130, 09/694,246, 09/712,877, 09/574, 921, 09/738,849, 09/718,809, 09/629,256, 09/712,367, 09/771,366, 09/715,803, 09/738,849, 09/791,431, 60/204, 095, 09/741,465, 09/574,921, 09/734,459, 09/741,465, 09/686,483, 09/584,420, 09/843,604, 09/780,120, 09/792, 622, 09/791,431, 09/811,354, 09/838,715, 09/715,803, 09/717,757, 09/771,013, 09/791,430, 09/712,367 and 09/780,124, and U.S. Pat. Nos. 6,285,701, 6,005,880, 6,061, 382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 6 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent applications Ser. Nos. 09/513,025, 09/780,120, 09/734,459 and 09/447,882, which are assigned to the same assignee as the present application, and U.S. Pat. Nos. 4,977,573, 4,393, 505 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

Processor Control

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to the wavefront compensation such as values of the bandwidth, and may control the wavefront compensation performed by a wavefront compensation optic in a feedback loop by sending signals to adjust the pressure(s) and/or curvature(s) of surfaces associated with the wavefront compensation optic (see U.S. Pat. Nos. 5,946,337, 6,061,382, 6,298,080 and 5,095,492 and U.S. patent application Ser. Nos. 09/843,604, 09/900,703 and 60/235,116, which are assigned to the same assignee as the present application, each patent and patent application being hereby incorporated by reference). The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 6, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

Solid State Pulser Module

The laser chamber 102 contains a laser gas mixture and includes one or more preionization units (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860, 300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent application Ser. Nos. 09/922,241 and 09/532,276 (sliding surface) and 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebrauchmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent application Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Resonator, General

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715, 803 and 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 09/883,128, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

Diagnostic Module

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosure

Particularly for the molecular fluorine laser system, and also for the ArF and KrF laser systems, an enclosure (not shown) preferably seals the beam path of the beam 120 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 102 and the optics modules 110 and 112 and between the beam splitter 122 and the diagnostic module 118 (see the application Ser. Nos. 09/317,695, 09/594,892 and 09/598, 552 applications, incorporated by reference above). The optics modules 110 and 112 are maintained in an atmosphere that is sufficiently evacuated or have an inert gas purged atmosphere. Preferred enclosures are described in detail in U.S. patent application Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221, 823, 5,763,855, 5,811,753 and 4,616,908, all of which are hereby incorporated by reference.

Gas Mixture

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513, 025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the application Ser. No. 09/513, 025 incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977, 573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the application Ser. No. 09/734,459, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary microhalogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the Be laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used along with the wavefront compensating optic 3, 13, 13 described above. For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Line-narrowing of the broadband emission of the ArF and/or KrF lasers may be as set forth below.

Exemplary line-narrowing optics contained in the optics module 110 include a beam expander, an optional interferometric device such as an etalon or a device having a pair of opposed non-planar reflection plates such as may be described in the application Ser. Nos. 09/715,803 or 60/280, 398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the application Ser. Nos. 09/715,803, 09/738,849, and 09/718,809, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the application Ser. No. 09/771,366 and the U.S. Pat. No. 6,154,470, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as μHIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{Opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent applications Ser. No. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at A, and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as defined by the claims below, and structural and functional equivalents thereof.

What is claimed is:

1. An excimer or molecular fluorine laser system, comprising:

a discharge chamber filled with a gas mixture at least including a halogen-containing molecular species and a buffer gas;

a discharge circuit;

a plurality of electrodes within the discharge chamber and connected to the discharge circuit for energizing the gas mixture;

a resonant cavity including the discharge chamber for generating a laser beam; and an intracavity homogenizer for homogenizing an intensity profile of the laser beam generated in the resonator, the intracavity homogenizer at least including:

a first bi-prism and a second bi-prism disposed at opposite ends of the resonant cavity and having the discharge chamber disposed therebetween, and wherein optical axes of the first bi-prism and the second bi-prism are each at least substantially parallel to the optical axis of the laser beam.

2. The laser system of claim 1, wherein the first bi-prism includes an angled face and a normal face, the angled face being oriented toward the discharge chamber including at least one segment oriented so that a normal to the segment forms an acute angle with an optical axis of the laser beam, and the normal face includes a reflective coating formed thereon opposite the angled face, and a normal to the normal face is at least substantially parallel to the optical axis of the laser beam.

3. The laser system of claim 2, wherein the second bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam.

4. The laser system of claim 3, wherein the planar face of the second bi-prism includes a reflective coating formed thereon opposite the angled face of the second bi-prism.

5. An excimer or molecular fluorine laser system, comprising:
a discharge chamber filled with a gas mixture at least including a halogen-containing molecular species and a buffer gas;
a discharge circuit;
a plurality of electrodes within the discharge chamber and connected to the discharge circuit for energizing the gas mixture;
a resonant cavity including the discharge chamber for generating a laser beam; and
an intracavity homogenizer for homogenizing an intensity profile of the laser beam generated in the resonator, the intracavity homogenizer at least including:
a bi-prism disposed at one end of the resonant cavity, and
wherein an optical axis of the bi-prism is at least substantially parallel to the optical axis of the laser beam.

6. The laser system of claim 5, wherein the bi-prism includes an angled face and a normal face, the angled face being oriented toward the discharge chamber including at least one segment oriented so that a normal to the segment forms an acute angle with an optical axis of the laser beam, and a normal to the normal face is at least substantially parallel to the optical axis of the laser beam.

7. The laser system of claim 6, wherein the normal face of the bi-prism includes a reflective coating formed thereon opposite the angled face of the bi-prism.

8. An excimer or molecular fluorine laser system, comprising:
a discharge chamber filled with a gas mixture at least including a halogen-containing molecular species and a buffer gas;
a discharge circuit;
a plurality of electrodes within the discharge chamber and connected to the discharge circuit for energizing the gas mixture;
a resonant cavity including the discharge chamber for generating a laser beam; and
an intracavity homogenizer for homogenizing an intensity profile of the laser beam generated in the resonator, the intracavity homogenizer at least including:
a bi-prism disposed within the resonant cavity, and
wherein an optical axis of the bi-prism is at least substantially parallel to the optical axis of the laser beam.

9. The laser system of claim 8, wherein the bi-prism includes an angled face and a normal face, the angled face including at least one segment oriented so that a normal to the segment forms an acute angle with an optical axis of the laser beam, and a normal to the normal face is at least substantially parallel to the optical axis of the laser beam.

10. The laser system of claim 9, wherein the angled face of the bi-prism is oriented toward the discharge chamber.

11. The laser system of claim 9, wherein the planar face of the bi-prism has a reflective layer formed thereon as a resonator reflector surface.

12. The laser system of claim 8, wherein the bi-prism is disposed between a resonator reflector optic and the discharge chamber.

13. The laser system of claim 8, wherein the resonant cavity further includes at least one line-narrowing optic for reducing a bandwidth of the laser beam.

14. The laser system of claim 8, further comprising a gas-handling module for replenishing the gas mixture.

15. An excimer or molecular fluorine laser system, comprising:
a discharge chamber filled with a gas mixture at least including a halogen-containing molecular species and a buffer gas;
a discharge circuit;
a plurality of electrodes within the discharge chamber and connected to the discharge circuit for energizing the gas mixture;
a resonant cavity including the discharge chamber for generating a laser beam; and
an intracavity homogenizer for homogenizing an intensity profile of the laser beam generated in the resonator, the intracavity homogenizer at least including:
a first bi-prism and a second bi-prism disposed within the resonant cavity and having the discharge chamber disposed therebetween, and
wherein optical axes of the first bi-prism and the second bi-prism are each at least substantially parallel to the optical axis of the laser beam.

16. The laser system of claim 15, wherein the first bi-prism includes an angled face and a normal face, the angled face being oriented toward the discharge chamber including at least one segment oriented so that a normal to the segment forms an acute angle with an optical axis of the laser beam, and a normal to the normal face is at least substantially parallel to the optical axis of the laser beam.

17. The laser system of claim 16, wherein the second bi-prism also includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam.

18. The laser system of claim 17, wherein the planar face of the second bi-prism includes a reflective coating formed thereon opposite the angled face of the second bi-prism.

19. The laser system of claim 16, wherein the planar face of the first bi-prism includes a reflective coating formed thereon opposite the angled face of the first bi-prism.

20. The laser system of claim 15, wherein the resonant cavity further comprises a highly-reflective mirror as a resonator reflector, and wherein the first bi-prism is disposed between the discharge chamber and the highly-reflective mirror.

21. The laser system of claim 20, wherein the second bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam, and
wherein the planar face of the second bi-prism includes a reflective coating formed thereon opposite the angled face of the second bi-prism.

22. The laser system of claim 15, wherein the resonant cavity further comprises a partially-reflective mirror as a resonator reflecting output coupler, and wherein the first bi-prism is disposed between the discharge chamber and the partially-reflective mirror.

23. The laser system of claim 22, wherein the second bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam, and wherein the planar face of the second bi-prism includes a reflective coating formed thereon opposite the angled face of the second bi-prism.

24. The laser system of claim 15, wherein the resonant cavity further comprises a roof prism as a resonator reflector, and wherein the first bi-prism is disposed between the discharge chamber and the roof prism.

25. The laser system of claim 24, wherein the second bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam, and wherein the planar face of the second bi-prism includes a reflective coating formed thereon opposite the angled face of the second bi-prism.

26. The laser system of claim 24, wherein the roof prism includes a highly-reflective coating formed thereon serving as a highly-reflective resonator reflector surface.

27. The laser system of claim 24, wherein the roof prism and first bi-prism are formed together as a single optical component.

28. The laser system of claim 27, wherein the roof prism includes a highly-reflective coating formed thereon serving as a resonator reflector surface.

29. An excimer or molecular fluorine laser system, comprising:

a discharge chamber filled with a gas mixture at least including a halogen-containing molecular species and a buffer gas;

a discharge circuit;

a plurality of electrodes within the discharge chamber and connected to the discharge circuit for energizing the gas mixture;

a resonant cavity including the discharge chamber for generating a laser beam;

a roof prism disposed within the resonant cavity as a resonator reflector; and an intracavity homogenizer for homogenizing an intensity profile of the laser beam generated in the resonator, the intracavity homogenizer at least including:

a bi-prism disposed within the resonant cavity; and wherein an optical axis of the bi-prism is at least substantially parallel to the optical axis of the laser beam.

30. The laser system of claim 29, wherein the bi-prism is disposed between the discharge chamber and the roof prism.

31. The laser system of claim 30, wherein the roof prism includes a reflective coating formed thereon serving as a resonator reflector surface.

32. The laser system of claim 31, wherein the roof prism and first bi-prism are formed together as a single optical component.

33. The laser system of claim 29, wherein the roof prism includes a reflective coating formed thereon serving as a first resonator reflector surface.

34. The laser system of claim 33, wherein the bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam, and wherein the planar face of the bi-prism includes a reflective coating formed thereon opposite the angled face of the bi-prism as a second resonator reflector surface.

35. The laser system of claim 33, wherein the bi-prism includes an angled face and a normal face, the angled face being oriented toward the discharge chamber including at least one segment oriented so that a normal to the segment forms an acute angle with the optical axis of the laser beam, and a normal to the normal face is at least substantially parallel to the optical axis of the laser beam, and wherein an angled face of the bi-prism is oriented toward the discharge chamber.

* * * * *